United States Patent Office 3,125,053
Patented Mar. 17, 1964

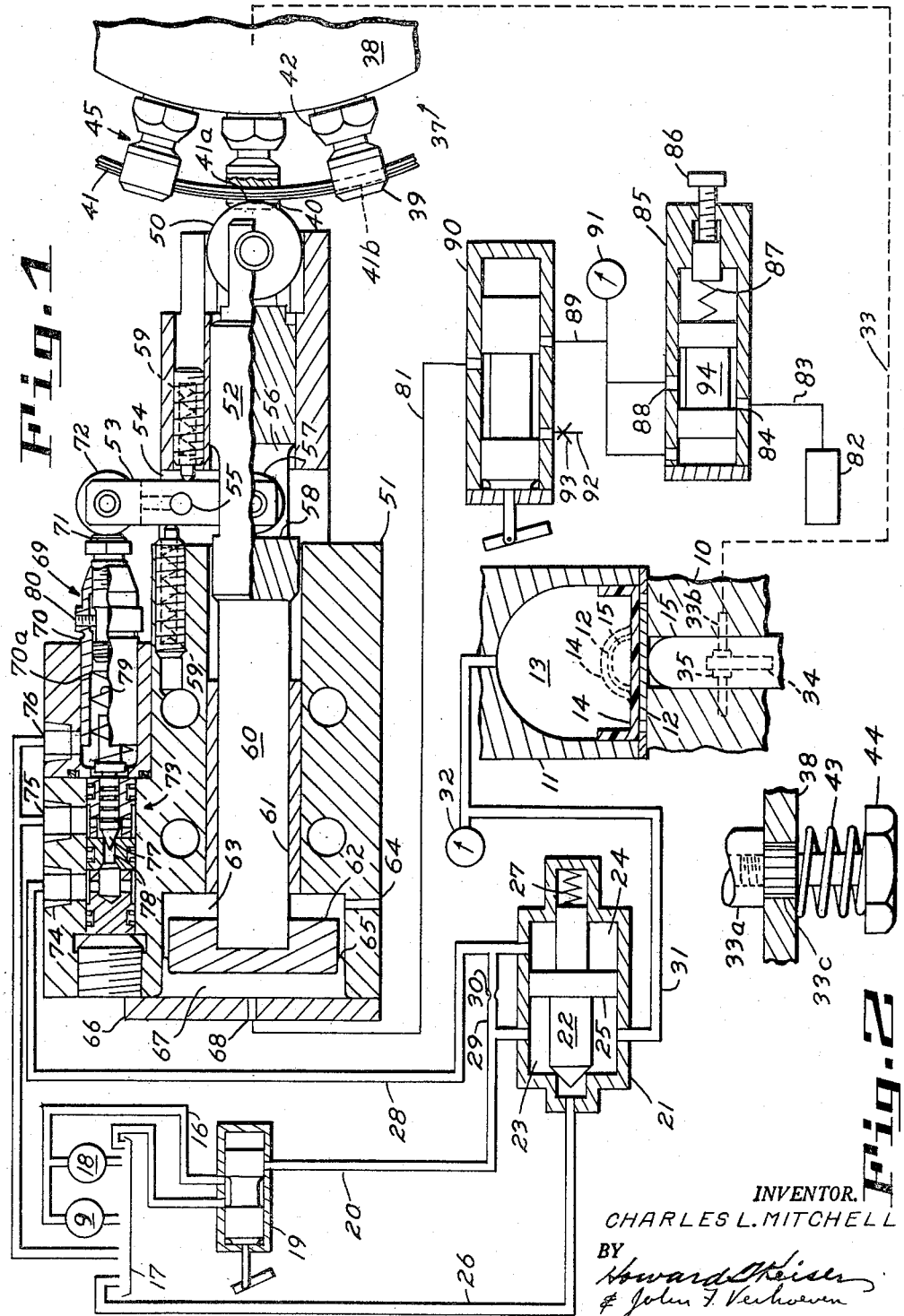
INVENTOR.
CHARLES L. MITCHELL
BY
ATTORNEYS

3,125,053
PRESSURE REGULATING MECHANISM FOR HYDRAULIC PRESS AND METHOD OF PROGRAMMING CAM THEREFOR
Charles L. Mitchell, Cincinnati, Ohio, assignor to The Cincinnati Milling Machine Company, Cincinnati, Ohio, a corporation of Ohio
Filed Aug. 26, 1960, Ser. No. 52,246
6 Claims. (Cl. 113—45)

The present invention relates to a hydraulic forming press of the type having a flexible die member enclosing a fluid pressure chamber, and more particularly to control of the pressure in the chamber during forming.

In a press in which a male die plunger is extended to urge a workpiece blank into a flexible diaphragm enclosing a fluid pressure chamber for forming the workpiece blank around the die plunger, it is desirable to control the pressure in the pressure chamber in coordination with the extension of the die member. Usually the hydraulic press is provided with a cam rotatable in response to movement of the plunger and one type of cam used heretofore has a flexible cam face, the portions of which can be radially adjusted. Means responsive to the position of a cam follower is provided to regulate the pressure in the chamber during a controlled pressure cycle and the position of the follower, when urged against a portion of the cam face during forming, thereby serves to establish, at any given time during the forming operation, a given pressure in the pressure chamber determined by the radial position of the portion of the cam face engaged with the follower. Thus, by radial adjustment of portions of the cam face which will rotate into engagement with the cam follower during extension of the male die for forming (each portion of the cam face, because of the mechanical linkage between the cam and the die plunger, corresponding to a different position of the die plunger during forming), the desired controlled forming pressure cycle in the chamber can be programmed into the cam.

With the present invention, programming of the cam for any desired controlled pressure cycle can be quickly effected. In one form of the invention, means is provided to apply, during setup, a series of different predetermined constant forces, one at a time, to the cam follower to urge the follower towards the cam. Means is also provided to apply a restoring force to the cam follower opposing any constant force applied thereto and increasing as the cam follower is displaced by the constant force so that, if the follower is not impeded by the cam, the restoring force will ultimately balance the constant force applied to the follower and the follower will come to rest in an equilibrium position determined by the magnitude of the constant, or positioning, force. During setup, if the cam face is initially adjusted inwardly and a series of constant positioning forces, one at a time, is applied to the cam follower, the follower will assume a series of different equilibrium positions spaced from the inwardly adjusted cam face. Since the constant positioning forces are applied to urge the follower toward the cam, the maximum constant positioning force applied to the follower will position the follower closest to the cam.

During forming with a controlled pressure cycle, fluid is released from the chamber pressure supply line by means including a variable relief valve which is controlled by the follower in a manner to increase the pressure in the chamber as the follower is moved toward the cam axis. Thus any given position of the follower, regardless of how that position is established, may be considered as corresponding to a given forming pressure in the chamber and the predetermined constant positioning forces applied to the follower during setup, which establish equilibrium positions of the follower, may also be considered as corresponding to predetermined forming pressures in the chambers. Thus each of these constant positioning forces may be calibrated, not in terms of their actual value, but in terms of the pressure that will be established in the pressure chamber when the follower, during forming, is in the same position as the equlibrium position thereof established by each constant positioning force during setup.

During setup, the cam can be disengaged from the die plunger and rotated, without the necessity of corresponding movement of the die plunger, to locate the respective portions of the cam face opposite the follower. To program the cam, the face portion thereof corresponding to the initial position of the die plunger is positioned opposite the follower, and a constant positioning force corresponding to the desired forming pressure at that initial die plunger position is applied to the follower. Since the cam face of the follower is initially adjusted inwardly for setup, the follower assumes the equilibrium position which corresponds to the desired initial forming pressure and the cam face portion opposite the follower is then adjusted outwardly to just touch the cam follower. Succeeding portions of the cam face are successively brought opposite the follower, one at a time, and similarly adjusted to touch the follower in the equilibrium position established by application of a constant positioning force to the follower corresponding to the desired pressure at the position of the die plunger corresponding to the portion of the cam face being adjusted. In this manner, the entire cycle can be quickly programmed into the cam.

During the forming operation a constant positioning force can be applied to the cam follower which corresponds to the maximum desired pressure in the chamber. This maximum positioning force, which may be considered a constant operating force applied to the cam follower since it is applied thereto during the entire forming cycle, would urge the follower to the maximum equilibrium position, or the equilibrium position closest to the cam axis, if the follower were not impeded by the cam face. However, where the cam face is programmed for pressures less than maximum, the follower will not reach this maximum equilibrium position but, instead, will be urged, or biased, against the cam for positioning thereby in accordance with the program set therein. No maladjustment of the cam face can possibly cause the pressure in the chamber to exceed the desired maximum pressure since the cam follower, biased by the constant operating force corresponding to the maximum desired chamber pressure, cannot move in the pressure increasing direction beyond the equilibrium position corresponding to the maximum desired chamber pressure.

With the structure of the present invention a natural cycle, that is a cycle where the quantity of fluid in the pressure chamber remains constant and the pressure rise during forming results solely from the diminution of the chamber by extension of the die plunger, can be performed without programming the cam. In this operation, only a predetermined amount of oil is introduced to the chamber, the cam is removed, and a positioning force is applied to the cam follower corresponding to the maximum desired pressure in the chamber. Since the follower assumes an equilibrium position corresponding to this positioning force, the relief valve operated by the follower will not operate to release pressure from the chamber until the maximum desired pressure therein is reached.

It is therefore one object of the present invention to provide mechanism to establish, in conjunction with a cam, pressure in the pressure chamber of a hydraulic press during forming, which mechanism can be utilized to quickly program the desired pressure cycle in the cam. It is another object of the present invention to provide mechanism in a hydraulic forming press operated by a flexible cam to establish the pressure in the pressure chamber of the press which will prevent pressures in excess of a desired maximum regardless of any improper adjustment of the cam. It is yet another object of the present invention to provide a cam operated, pressure controlling, mechanism for the pressure chamber of a hydraulic press which can be utilized, when the cam is removed, for the formation of workpieces in a natural pressure cycle to release fluid from the chamber only after a predetermined maximum pressure is reached. It is still another object of the present invention to provide a method of quickly programming a flexible cam of a hydraulic forming press during setup to preset therein a desired pressure cycle for the chamber of the press during forming.

Other objects and advantages of the present invention should be readily apparent by reference to the following specification, considered in conjunction with the accompanying drawings forming a part thereof, and it is to be understood that any modifications may be made in the exact details there shown and described, within the scope of the appended claims, without departing from or exceeding the spirit of the invention.

In the drawings:

FIG. 1 is a view showing, in somewhat schematic form, portions of a hydraulic press incorporating the structure of the present invention; and FIG. 2 is a view showing the mounting of the flexible cam.

There is shown in FIG. 1 the nest bed 10 and head 11 of a hydraulic forming press. The members 10 and 11 are relatively movable in the vertical direction between an open position, for loading the workpiece blank 12 and unloading a workpiece formed therefrom, and a closed position as shown in FIG. 1 which is maintained during forming of the workpiece. The head 11 has a pressure chamber 13 closed at its lower end by a flexible diaphragm 14 which constitutes a flexible die member, and the bed 10 has a male die member, or plunger, 15 which can be elevated when the press is closed. With hydraulic pressure in chamber 13 and a workpiece blank 12 loaded on the nest bed 10, the blank is formed, on elevation of the plunger 15, to conform to the shape of the plunger by the pressure in chamber 13 acting through the flexible die member 14 as indicated by the dotted lines in FIG. 1.

Circuitry for supplying hydraulic fluid to chamber 13 is shown in FIG. 1. A pump 9 supplies fluid under pressure to line 16 from sump 17, relief valve 18 establishing a maximum pressure, exceeding the desired maximum chamber pressure, in that line. When blocking valve 19 is shifted to the right from the position shown, after the press has been closed, line 16 is connected to line 20 through the valve 19 and pressure is introduced to the pressure regulating valve 21. This valve has a movable valve plunger 22 and two chambers 23 and 24 separated by piston 25 carried on the plunger 22. At one end, the plunger 22 controls flow from chamber 23 to line 26 leading to sump 17 and, at the opposite end, a spring 27 urges the plunger toward a position blocking line 26. Line 20 is connected to chamber 23 and a line 28 is connected to chamber 24. Line 29, containing restriction 30, connects lines 20 and 28. The effective areas of the plunger 22 and piston 25 acted upon by fluid in chambers 23 and 24 are substantially the same so that when line 28 is blocked at the end opposite its connection to chamber 24 the opposing hydraulic forces exerted on the piston and plunger are balanced and the plunger 22 is held in the left hand position, as shown in FIG. 1, by spring 27. If, on the other hand, line 28 is opened at said opposite end so that fluid flows from line 20 to line 28 the pressure in chamber 24 drops below the pressure in chamber 23 because of the pressure drop across restriction 30, and plunger 22 is shifted to the right, permitting the escape of fluid from chamber 23 through line 26, until the opposing forces applied to the piston and plunger are balanced. The amount line 28 is opened determines the pressure established in chamber 23 since the more line 28 is opened, the further to the right the plunger 22 will be positioned and, with more fluid escaping through line 26, the lower the pressure in chamber 23 will be. The chamber 23 of valve 21 is connected by line 31 to chamber 13 in head 11, the gage 32 connected to line 31 indicating the pressure in the chamber 13. The lines 20 and 31 thus define a supply line for chamber 13 from which fluid can be released (by means of valve 21) to control the pressure in chamber 13.

The extension of die plunger 15 when the press is closed during forming progressively diminishes the size of chamber 13. In some workpiece forming operations it is desirable to utilize a natural pressure cycle, that is, a cycle where the quantity of hydraulic fluid in chamber 13 remains constant during forming and the pressure in chamber 13 is allowed to increase in accordance with the diminution of the size of the chamber by elevation of plunger 15. Thus, during a natural cycle, a predetermined amount of fluid is introduced to the chamber 13 and line 28 remains closed so that no fluid escapes through line 26. With many forming operations, however, it is desirable to control the pressure during forming so that it follows a predetermined programmed cycle. To achieve this, fluid is continuously supplied to the chamber supply line 20, 31, and released therefrom as line 28 is opened a controlled and varying amount in coordination with the elevation of plunger 15.

One method of coordinating the control of pressure in the pressure chamber with movement of a male die plunger which changes the size of the chamber during forming is by means of a cam mounted on a shaft portion, such as shaft portion 33a, shown in FIG. 2, which is mechanically connected as indicated at 33, to a shaft portion 33b connected to the plunger 15 for rotation as the plunger is moved vertically. The connection between the plunger 15 and shaft portion 33b may, for example, include a rack 34 connected to the plunger and engaged with a pinion 35 mounted on the shaft portion 33b which is journaled in the bed 10. One form of cam used heretofore, indicated at 37, includes a hub 38 in which circumferentially spaced mounting studs 45 are received. Each stud 45 has a head 39 with a groove 40 in which a flexible band 41, defining the cam face, is secured. Each stud has a body 42 threadedly received in hub 38 and rotatable relative to the head 39 which is mounted thereon. When the body 42 of a stud is rotated the portion of the cam face at that particular stud is radially adjusted relative to the hub 38 and the cam axis defined by shaft portion 33a. Since the cam 37 is mechanically connected for rotation in response to movement of the male die plunger 15 during forming, different portions of the cam face 41 will be opposite the follower when the plunger 15 is at different positions during the forming cycle. Thus, during forming, portion 41a is opposite the follower when the plunger 15 is in an initial position as shown in FIG. 1, and portion 41b is opposite the follower when the plunger 15 has been raised a predetermined amount to another position. Thus these portions of the cam face, and succeeding portions thereof, correspond to different succeeding positions of the die plunger 15 during forming. As shown in FIG. 2 the cam hub 38 is received on splined end portion 33c of shaft portion 33a and held thereon by spring 43 interposed between the hub 38 and the head of a bolt 44 received in the end of the shaft. With this construction the hub 38 can be slipped off the splined portion of shaft 33a for rotation without corresponding movement of plunger 15, or, by removal of bolt 44, can be removed completely from the press.

The cam follower of the present invention comprises a plunger 52 and a roller 50 mounted thereon. The plunger 52 is slidably received in a housing 51 mounted adjacent the cam 37. An arm 53 is received in, and extends from, a slot 54 in the housing and is pivotally connected to the housing by pin 55. The inner end of the arm is received in a slot 56 in plunger 52 and has a roller 57 mounted thereon which engages the flat surface 58 of slot 56. The arm 53 is urged clockwise about pivot pin 55 by a pair of springs 59 mounted in housing 51 which engage arm 53 close to pivot pin 55, one on each side of the pin, and hold the roller 57 against the surface 58. Abutting against the inner end of plunger 52 is a piston rod 60 slidably received in bushing 61 in the housing and carrying piston 62 at the end opposite plunger 52. The piston, which is received in a recess 63 closed by end plate 66 and vented to the atmosphere at 64, has a flexible diaphragm 65 connected thereto and defining with end plate 66 a chamber 67 to receive air under pressure through inlet port 68.

There is slidably received in housing 51 a plunger designated generally as 69 and comprising a sleeve 70 and a stud 71 threadedly received in one end of the sleeve. The stud 71 is adapted to engage a roller 72 mounted on the arm 53 opposite roller 57. A relief valve, indicated generally at 73, is contained in the housing 51. The relief valve has a port 74 to receive fluid from line 28 and has discharge ports 75 and 76. A plunger 77 in the relief valve is urged toward a position to close passage 78 connecting ports 74 and 75 by a spring 79 received in sleeve 70 and engaged with shoulder 70a therein. The passage 78 opens when the force produced by the pressure in line 28 overcomes the force exerted by the spring 79, and the amount the passage 78 opens will be affected by the spring force which is determined, for any given length of plunger 69, by the position of roller 72 which, in turn is determined by the position of the cam follower. Thus the position of the cam follower determines the operation of the relief valve 73.

During a controlled pressure forming cycle in which fluid is continuously supplied to the chamber pressure supply line (20, 31), the amount of fluid escaping through the relief valve 73, and hence the amount of fluid released from the chamber pressure supply line (20, 31) through line 26, will be restricted by the relief valve in accordance with the position of the cam follower to establish a predetermined pressure in line (20, 31), and hence in the chamber 13, which pressure corresponds to the position of the follower. When set screw 80, which locks stud 71 in sleeve 70, is loosened, the effective length of the plunger 69 can be changed to change the force exerted on relief valve plunger 77 for any given position of roller 72. Elongating plunger 69 will decrease the amount passage 78 is opened for any given position of the cam follower, and thereby a higher pressure will result in the chamber 13, while shortening plunger 69 will have the opposite effect on the chamber pressure. Fluid leaking past plunger 77 is returned to sump 17 through discharge port 76.

During setup, a range of selected constant forces can be applied to the end of plunger 52 opposite roller 50 by introduction of selected air pressures into chamber 67 through the line 81 which is connected to inlet port 68. To this end a source 82 of air under pressure is connected by line 83 to port 84 of a pneumatic pressure regulating valve 85. Air at a reduced pressure, determined by the setting of knob 86 which adjusts the spring 87 connected to valve plunger 94, passes from port 88 through line 89 to blocking valve 90 which, when set in the right hand position, connects line 89 to line 81. Gage 91, connected to line 89, indicates the pressure introduced to chamber 67 when the blocking valve 90 is shifted to the right and thus indicates the force exerted against the end of plunger 52 opposite roller 50. By adjustment of knob 86, a series of constant forces can thus be applied, one at a time, to the cam follower urging the follower toward the cam.

If the cam 37 is removed, or the flexible cam face 41 radially adjusted inwardly to avoid contact by the roller 50, the roller 50, on application of a given constant force to the end of plunger 52 opposite roller 50, will be shifted toward the cam axis, that is to the right, as viewed in FIGURE 1, to a given equilibrium position determined by the constant force applied thereto. This is because the spring 79, aided slightly by springs 59, applies a restoring force through roller 72, arm 53, and roller 57 to plunger 52, opposing the pneumatic force applied at chamber 67, the restoring force increasing as the plunger 52 shifts to the right and balancing the constant pneumatic force when the plunger reaches the equilibrium position. Since the magnitude of any pneumatic force applied through chamber 67 (which depends on the setting of knob 86) determines the equilibrium position of the cam follower and roller 72, and since the position of the cam follower and roller, during controlled pressure forming, determines the operation of plunger 77 and the pressure in chamber 13, the gage 91, although operated by the air pressure in line 89 which may be relatively low compared to forming pressures in chamber 13, can be calibrated in terms of the corresponding forming pressures which will exist in chamber 13 when the follower, during forming, is in the same positions as the respective equilibrium positions established by the pneumatic forces applied during setup. These pneumatic positioning forces (and positioning pressures producing the forces) are proportional to the corresponding forming pressures. If the pivot pin 55 is centrally located between rollers 72 and 57, passage 78 can not begin to open until the force applied at that end of the system comprising plunger 77, spring 79, plunger 69, roller 72, arm 53, roller 57, plunger 52, rod 60, and piston 62 equals the force exerted, in chamber 67, at the opposite end of the system, ignoring the effect of the springs 59 on the system which is quite small because of the proximity of the springs to pivot pin 55. Thus, if the actual pressure in line 81, 89 is multiplied by the ratio of the effective area over which pressure is exerted on piston 62 urging it to the right to the effective area of plunger 77 over which pressure in passage 78 urges it to the right, this product, when marked on the dial of gauge 91, will give the pressures which will be established in chamber 13 during forming when the cam follower is in the same positions as the equilibrium positions established by the respective air pressures produced in lines 81, 89 during setup.

With this mechanism the cam can be adjusted quickly and accurately with the aid of the follower to program the pressure cycle in the pressure chamber 13 for a contemplated forming operation. This can be done during setup and since pressure in the hydraulic fluid lines of the machine, or in chamber 13, is not required for programming the cam, the press, and supply pump 9 thereof, can be shut off so long as air pressure from source 82 is available. To program the cam for a desired controlled pressure forming operation, the portions of the flexible cam face 41 which will engage the follower during forming are shifted inwardly by adjustment of mounting studs 45. The cam hub 38 is initially positioned relative to shaft 33a so that the portion 41a, which will be opposite roller 50 when the plunger 15 is in its initial position as shown in FIG. 1, is in registration with roller 50. Valve 90 is shifted to the right and knob 86 is initially adjusted until the gage 91 (which is calibrated in terms of desired pressure in chamber 13) indicates the desired initial forming pressure. This will produce a predetermined force in chamber 67 which will move the roller 50, unimpeded by the cam, to a corresponding equilibrium position. The cam face portion 41a is then adjusted radially outwardly until it just touches the roller 50. The cam hub 38 is then rotated relative to shaft 33a so that another portion, such as 41b, corresponding to another position of the die plunger 15, will be opposite the roller. The knob 86 is again adjusted until the gage 91 indicates the desired pressure in chamber 13 when the plunger 15 is in the position corresponding to the cam face portion opposite the roller 50. Again the roller 50 will assume an equilibrium position and the cam face portion 41b is adjusted to just touch the roller 50. This process is repeated for successive portions of the cam face 41. The final portion of the cam face 41 which corresponds to the final extended position of die plunger 15 (where forming pressure in the usual pressure cycle will be maximum) can be adjusted inwardly to avoid contact with roller 50. Thus by applying a series of predetermined forces to the cam follower corresponding to desired pressures in the chamber during the cycle, the cam can be programmed by positioning the respective portions of the face thereof to touch the roller in its respective equilibrium positions.

To perform a controlled pressure forming operation, the workpiece blank 12 is loaded in the press, the press is closed as shown in FIG. 1, and the male die plunger is positioned at an initial position as shown in FIG. 1. The cam hub 38 is engaged with shaft 33a with the cam face portion 41a located opposite roller 50. Knob 86 is adjusted until dial 91 indicates the maximum pressure to be reached in the cycle (which will be the final forming pressure). The pneumatic force thus applied to the cam follower will not position that member in the equilibrium position because that position is further to the right than the cam follower is permitted to move by the cam face portion 41a, but the pneumatic force instead acts as a biasing, or operating, force urging the follower against the cam. The valve 19 is shifted to the right and the pressure in lines 20, 31 and chamber 13 will build up until the pressure reaches the value programmed into portion 41a of the cam, since that portion of the cam determines the position of the follower and roller 72, and hence determines operation of relief valve 73. Passage 78 in relief valve 73 remains closed until the programmed pressure is reached and then opens an amount permitting enough fluid from line 28 to escape to sump 17 through port 74, passage 78 and port 75 to maintain that pressure in lines 20, 31, and hence in chamber 13. Assuming a cycle in which the pressure rises as the die plunger 15 rises, the cam face 41 will be closer to the cam axis as the plunger 15 extends and follower 50, by virtue of the operating force applied thereto, will shift to the right, thereby shifting roller 72 to the left. This will increase the force applied to relief valve plunger 77 through spring 79, thereby increasing the pressure in line 28 and consequently increasing the pressure in line 20, 31 and chamber 13. At the final position of the die plunger 15, the corresponding portion of the cam face 41 is beyond the equilibrium position of the cam follower under the operating force applied thereto. However, since the follower cannot move any further to the right than its equilibrium position, the pressure in chamber 13 cannot exceed the maximum pressure as dialed by knob 86 at the beginning of the operation. For this reason no maladjustment of cam face 41 can possibly cause pressure in chamber 13 to exceed the desired maximum pressure as set by knob 86. It will be noted that during the forming operation a portion of the biasing, or operating, force is counteracted by the restoring force, the portion so counteracted increasing as the programmed pressure increases until, at the end of the pressure cycle where the chamber pressure is maximum, all of the operating force is transmitted to the relief valve. Thus, at no time does the flexible cam face receive all the biasing force and the force which is transmitted thereto decreases (assuming a cycle with a rising chamber pressure) as the cycle progresses. Thus any tendency to deflect the flexible cam face from its programmed position is minimized throughout the cycle and the possibility of deflection becomes negligible as the cycle approaches completion.

Release of pressure from chamber 13, after the workpiece has been formed (and before the press is opened) is effected by shifting valve 90 to the left (to the position shown in FIG. 1). This connects line 81 to exhaust line 92 containing restriction 93 to relieve pressure from chamber 67 at a rate determined by restriction 93. The plunger 52 is moved to the left by arm 53, the springs 59 rotating the arm beyond the reach of spring 79. Thus, plunger 69 and spring 79 are rendered ineffective to hold passage 78 of relief valve 73 closed and the flow from line 28 to sump 17 through relief valve 73 causes plunger 22 of valve 21 to shift to the right and release pressure from chamber 13 at a rate determined by the restriction 93.

If it is desired to raise (or lower) all the forming pressures the same amount, but yet maintain the same final maximum pressure, this can be accomplished by merely changing the length of plunger 69. Since the position of the follower, and hence roller 72, is determined solely by the cam face for all positions of the die plunger 15 except the final position, changing the length of plunger 69 will alter the operation of the relief valve 73 (and hence pressures in chamber 13) without alteration of the cam face. The position of the follower, and hence roller 72, at the final position of die plunger 15, however, is not determined by the cam face since the portion of the cam face corresponding to the final position of the plunger was adjusted during setup to avoid contact by the roller. Hence the cam follower, regardless of the length of plunger 69, assumes an equilibrium position at the final position of die member 15. Although the equilibrium position assumed will differ for different lengths of plunger 69, the force exerted by spring 79 on relief valve plunger 77 is determined solely by the constant pneumatic force applied to the follower (since, when the cam face is ineffective to position the cam follower, the restoring force builds up to just balance the applied constant pneumatic force) and any change in plunger length will not change this force. Thus, although changing the length of plunger 69 will change all pressures controlled by the cam face, the final pressure, which is controlled solely by the magnitude of the operating force applied to the cam follower, will not be changed. Conversely, changing the setting of knob 86 without changing the length of plunger 69, will change only the final maximum forming pressure and not any of the other forming pressures established during the forming operation providing knob 86 is not set to a pressure below any of said other forming pressures. This is because these latter pressures, for any given length of plunger 69, depend solely on the position of the cam follower which is determined by the cam face and not on the magnitude of the biasing, or operating, force applied to the cam follower. The final maximum forming pressure, however, is determined only by the magnitude of the operating force produced in chamber 67 and it is only adjustment of knob 86 which will change this operating force.

If it is desired to change all pressures of the programmed pressure cycle the same amount, including the final pressure, the portion of the cam face corresponding to the final position of the die plunger, instead of being adjusted inwardly during programming to avoid contact with the roller 50, can be adjusted as other portions of the cam face so that it will be the position of the cam face, instead of the magnitude of the operating, or biasing, force which will determine this final pressure. With this programming of the cam, all pressures can be changed by adjustment of the length of plunger 69 and changing the adjustment of knob 86 will not affect the programmed cycle providing it is set to correspond to a chamber pressure at least as great as the maximum programmed pressure.

With the present invention, a previously performed cycle can be quickly duplicated by reproducing the same positioning forces, during setup, as previously used, by successively duplicating, on gauge 91, the chamber pressures used in the previous cycle. If the condition of spring 79 has changed, or the spring 79 has been replaced by a spring not having identical characteristics, the successive equilibrium positions will change from those assumed by the follower in the previous operation. Although the new equilibrium position for any given reading on gauge 91 will differ from the previous equilibrium position for that reading, the force applied to relief valve 73 will be the same as in the previous setup because that force, as before, must just balance the applied positioning force (which is the same as in the previous cycle) to define the equilibrium position of the follower. Thus when the cam face is set to correspond to the new equilibrium positions, it will successively position the follower to cause the same forces to be exerted on the relief valve as in the previous cycle it is desired to duplicate, and therefore the same chamber pressure cycle will be produced.

To form a workpiece with a natural cycle, the cam 37 is removed from the press and the knob 86 is set to correspond to the maximum desired forming pressure. With the male die plunger 15 in the position shown in FIG. 1, valve 19 is shifted to the right until gauge 32 indicates the desired initial forming pressure, and is then shifted back to the position shown in FIG. 1 to shut off fluid to chamber 13. During this precharge of chamber 13, passage 78 in relief valve 73 is held closed since this initial forming pressure is less than the maximum desired pressure set by knob 86 and the relief valve 73 will not open until this maximum pressure is reached. As the die plunger 15 is extended the pressure in chamber 13 will increase in accordance with the diminution of the chamber, until the maximum desired forming pressure, set by knob 86, is reached. At that time passage 78 in the relief valve will open and hold the pressure in chamber 13 at the desired value.

What is claimed is:

1. In a forming press having a hydraulic pressure chamber and a die plunger movable to alter the size of said chamber, said press having means to mount a cam thereon, the combination of a movable cam follower adjacent the cam mounting means, means to apply a selected positioning force to the cam follower, means providing a restoring force to the cam follower whereby the cam follower will assume an equilibrium position determined by the magnitude of the selected positioning force applied thereto when unimpeded, said equilibrium position of the cam follower indicating a desired cam face position, means to move the cam mounting means in accordance with movement of the die plunger during forming, and means responsive to the position of the cam follower when urged into contact with a cam on said cam mounting means during forming to regulate the pressure in said chamber.

2. In a forming machine having a hydraulic pressure chamber and a die plunger movable to diminish the size of said chamber during forming, the combination of a cam having an adjustable cam face, a cam follower mounted adjacent the cam, means to apply selected positioning pressures to the cam follower corresponding to desired chamber forming pressures to urge said follower toward the cam, means to apply a restoring force to the cam follower proportional to the displacement thereof to define an equilibrium position of the cam follower when unimpeded for each selected positioning force applied thereto, means to adjust portions of the cam face to touch the cam follower in selected equilibrium positions thereof when said portions are opposite the cam follower, means connecting the cam to the die plunger during forming for movement of the cam in accordance with movement of the plunger, and means responsive to the position of the cam follower when the cam follower is urged into contact with the cam during forming to regulate the pressure in the hydraulic pressure chamber.

3. In a forming machine having a hydraulic pressure chamber and a die plunger movable to diminish the size of said chamber during forming, the combination of a cam having an adjustable cam face, a cam follower mounted adjacent the cam, means including a pressure regulating valve to apply selected positioning pressures to the cam follower during setup corresponding to desired chamber forming pressures and to apply an operating pressure to the cam follower during forming greater than said positioning pressures, said pressures urging the cam follower toward the cam, a relief valve having a spring and operable to release pressure from the chamber during forming in accordance with the force acting thereon through said spring, means connecting the cam follower to the spring to exert a force on the relief valve through the spring increasing as the cam follower is displaced toward the cam, said spring providing a restoring force to the cam follower resisting said positioning and operating forces to define equilibrium positions of the cam follower when unimpeded by the cam for each selected positioning pressure and the operating pressure applied thereto, means to adjust portions of the cam face during setup to touch the cam follower in selected equilibrium positions thereof when said portions are opposite the cam follower, and means connecting the cam to the plunger for movement of the cam in accordance with movement of the plunger to move the cam follower and thereby control said relief valve when said operating pressure is applied to the cam follower during forming.

4. In a forming machine having a chamber to receive hydraulic fluid under pressure and a die plunger movable to diminish the size of said chamber during forming, the combination of a cam having an adjustable cam face, a cam follower, a housing adjacent the cam to slidably receive said cam follower and having a pneumatic pressure chamber therein operable to urge the cam follower toward the cam in accordance with the pressure therein, a source of air under pressure, means including a pressure regulating valve between said source and said pneumatic chamber to apply selected positioning pressures to the pneumatic chamber during setup proportional to desired chamber pressures and to apply a pneumatic operating pressure thereto during forming proportional to a maximum chamber pressure, a relief valve having a spring and operable to release pressure from said hydraulic pressure chamber during forming in accordance with the force acting thereon through said spring, means including a plunger connecting the cam follower to the spring to exert a force on said spring increasing as the cam follower is displaced toward the cam, said plunger adjustable in length to adjust the force acting on the relief valve through the spring for any given position of the cam follower, said spring providing a restoring force to the cam follower resisting the forces applied to the cam follower through said pneumatic pressure chamber when said positioning and operating pressures are applied thereto to define equilibrium positions of the cam follower when unimpeded by the cam for each selected positioning pressure and the operating pressure applied to the pneumatic chamber, means to adjust portions of the cam face during setup to touch the cam follower in selected equilibrium positions thereof when said portions are opposite the cam follower, and means connecting the cam to the die plunger for movement of the cam in accordance with movement of the die plunger during forming to move the cam follower and thereby control said relief valve when said operating pressure is applied through said pneumatic chamber to the cam follower during forming to urge the follower against the cam.

5. The method of programming a flexible cam movable during the forming operation in a hydraulic forming press to present different portions of the cam face to a follower at different portions of the forming cycle, said follower operable to establish the pressure in the pressure chamber of the press during forming in accordance with its position and having a restoring force acting thereon in one direction, the method comprising applying a series of predetermined forces, one at a time, to the follower opposing said restoring force to position the follower in a series of predetermined equilibrium positions, said forces being calibrated in terms of pressures which would be developed in the pressure chamber during forming when the follower is in the equilibrium positions established by said forces, said series of forces corresponding to the pressures desired in the pressure chamber at said respective portions of the forming cycle, and successively positioning said portions of the cam face opposite the follower and adjusting said portions, one at a time, to just touch the follower when said follower is in said respective equilibrium positions.

6. The method of programming during setup a flexible cam rotatable during forming in response to extension of the male die member in a hydraulic press having a flexible die member enclosing a pressure chamber to produce a desired pressure cycle in the chamber coordinated with the movement of the male die member, the press having a cam follower operable to establish the pressure in the pressure chamber in accordance with its position, said cam follower having a restoring force acting thereon to urge the cam follower away from the cam, the steps of adjusting inwardly a first portion of the cam face which will engage the follower during forming when the male die member is in a first position and locating said first portion of the cam face opposite the follower, applying a first predetermined force to the follower opposing said restoring force and of a magnitude to position the cam follower in an equilibrium position corresponding to the required position of the follower during forming to produce a first pressure in the chamber as desired at the first position of the male die member, adjusting the first portion of the cam face outwardly to just touch the cam follower, and repeating said steps for successive portions of the cam face which will engage the cam follower during forming.

References Cited in the file of this patent
UNITED STATES PATENTS
2,605,731   Schulze et al. _____ Aug. 5, 1952